(No Model.)
W. T. CARROLL.
SUPPORT FOR SPINNING SPINDLES.
No. 364,897. Patented June 14, 1887.
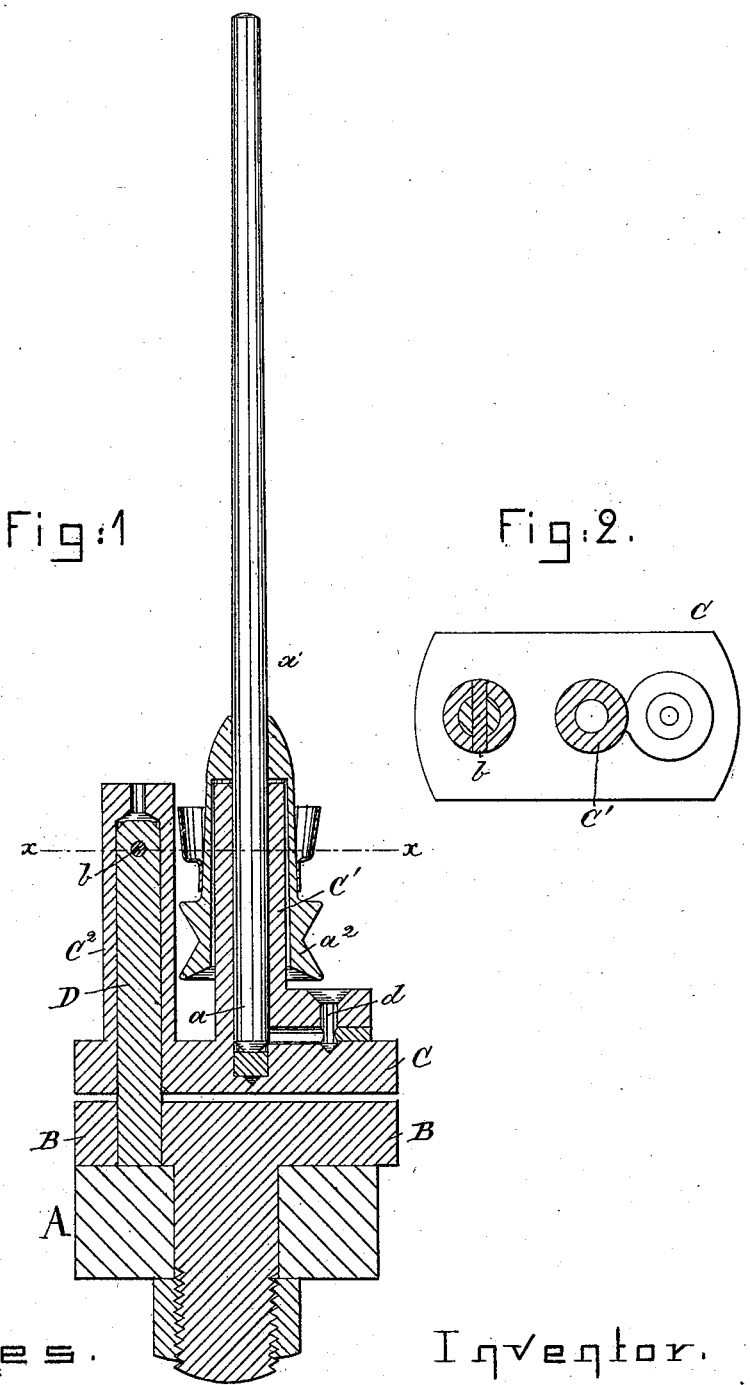

United States Patent Office.

WILLIAM T. CARROLL, OF WORCESTER, ASSIGNOR TO GEORGE DRAPER & SONS, OF HOPEDALE, MASSACHUSETTS.

SUPPORT FOR SPINNING-SPINDLES.

SPECIFICATION forming part of Letters Patent No. 364,897, dated June 14, 1887.

Application filed June 1, 1886. Serial No. 203,727. (No model.)

*To all whom it may concern:*

Be it known that I, WILLIAM T. CARROLL, of Worcester, county of Worcester, and State of Massachusetts, have invented an Improvement in Supports for Spinning-Spindles, of which the following description, in connection with the accompanying drawings, is a specification, like letters on the drawings representing like parts.

My invention has for its object to improve that class of spindle-bearings which are attached to the bolster rail or base at a single point, and by means of a flexible connection located outside of the rail and eccentric to the axial line of the spindle and its lateral bearings.

My invention consists, essentially, in a bearing, a flexible support or pin to sustain it, and a rail or base to hold the pin, the bearing and pin being connected together in such manner as to utilize the torsional strain in the pin.

Figure 1 in vertical section shows a bearing supported in accordance with my invention upon a rail or base, the spindle being in elevation; and Fig. 2 is a section of Fig. 1 in the line $x\ x$, looking downward, the sleeve-whirl and spindle being removed.

The bolster-rail A, as herein shown, receives the base B, above which is held the foot C of the bearing C'; the said bearing and foot being a rigid and preferably integral piece or casting, having a sleeve, $C^2$, bored to form a hole substantially parallel with relation to the hole in the tube-like part C' of the bearing, the latter part receiving the pintle $a$ of the spindle $a'$, having attached to it a sleeve-whirl, $a^2$, of usual construction, the said whirl surrounding the upright bearing C'. The sleeve $C^2$ of the bearing referred to is placed over a vertical pin or stud D, extended upwardly from the base B, the said sleeve fitting the said pin or stud and being connected therewith by a locking-pin, $b$, which is extended through the said sleeve and pin D, as best shown in Fig. 2. The pin or stud D supports the bearing for the spindle above and out of contact with relation to the base B and rail A, so that the bearing is free to yield to a limited extent to counteract the shock produced at the foot of the spindle owing to rapid rotation or unequal loading thereof. The bearing is retained in its normal position by the locking-pin $b$, the said pin preventing the bearing from being lifted from the pin or stud D accidentally. This pin D also serves another very important purpose—viz: When the bearing C' and its foot are subjected, through the band-pull, or by reason of other strains, to such strain as would tend to move the bearing about the stud or pin D, located eccentrically to the longitudinal axis of the spindle, the locking-pin at such times affords such a connection between the sleeve $C^2$ and the said pin or stud D as to enable the tendency of the bearing to move in a circular path about the said pin or stud D, to be substantially counteracted by the torsional strain produced upon the pin or stud D. The bearing C' is oiled through the hole $d$, which communicates with a channel made in the foot C.

I claim—

A spindle and a sleeve-whirl, the bearing C' for the spindle, and its connected sleeve $C^2$, combined with a vertical stud or pin to support the said bearing, and with means to lock together the said sleeve and stud or pin, substantially as described.

In testimony whereof I have signed my name to this specification in the presence of two subscribing witnesses.

WILLIAM T. CARROLL.

Witnesses:
G. W. GREGORY,
F. CUTTER.